(12) United States Patent
Pöllänen

(10) Patent No.: US 12,379,104 B2
(45) Date of Patent: Aug. 5, 2025

(54) METHOD AND AN ARRANGEMENT FOR MEASURING MASS CHANGES OF HEAT EXCHANGERS OF A STEAM BOILER

(71) Applicant: ANDRITZ OY, Helsinki (FI)

(72) Inventor: Ilkka Pöllänen, Valkeala (FI)

(73) Assignee: ANDRITZ OY, Helsinki (FI)

( * ) Notice: Subject to any disclaimer, the term of this patent is extended or adjusted under 35 U.S.C. 154(b) by 570 days.

(21) Appl. No.: 17/608,930

(22) PCT Filed: May 8, 2020

(86) PCT No.: PCT/FI2020/050313
§ 371 (c)(1),
(2) Date: Nov. 4, 2021

(87) PCT Pub. No.: WO2020/225489
PCT Pub. Date: Nov. 12, 2020

(65) Prior Publication Data
US 2022/0357032 A1 Nov. 10, 2022

(30) Foreign Application Priority Data
May 9, 2019 (FI) .................................... 20195386

(51) Int. Cl.
*F22B 37/56* (2006.01)
*F22B 37/24* (2006.01)
(Continued)

(52) U.S. Cl.
CPC ............ *F22B 37/56* (2013.01); *F22B 37/244* (2013.01); *F28F 19/00* (2013.01); *F28G 15/003* (2013.01);
(Continued)

(58) Field of Classification Search
CPC ........ F22B 37/244; F22B 37/56; F22B 37/48; F28F 19/00; F28F 2200/00; F28G 15/003;
(Continued)

(56) References Cited

U.S. PATENT DOCUMENTS 5,048,344 A 9/1991 Herget et al.
6,323,442 B1 11/2001 Jones
(Continued)

FOREIGN PATENT DOCUMENTS

CN 1475768 A 2/2004
CN 108613162 10/2018
(Continued)

OTHER PUBLICATIONS

SBT_Accounting_for_Material_Thermal_Expansion_and_Torsional_Tensile_Strength.pdf (Year: 2013).*
(Continued)

*Primary Examiner* — Michael G Hoang
*Assistant Examiner* — Kurt J Wolford
(74) *Attorney, Agent, or Firm* — Nixon & Vanderhye P.C.

(57) ABSTRACT

A method for measuring mass changes of a heat exchanger bank (1, 2, 3) or the heat exchangers thereof of a steam boiler, which heat exchanger (4) is supported by hanger rods (7) to support beams (5,8) above the steam boiler, wherein at least one hanger rod (7) of at least one heat exchanger (4) is connected a lower measuring element (9) and an upper measuring element (10), and the changes of the measuring length (X) between the measuring elements (9, 10) is measured by a measuring instrument (15) connected between the measuring elements (9, 10) for measuring the mass changes of the heat exchanger (4). The measuring instrument (15) may be attached in between the measuring elements (9, 10) and the change in the measuring length (X) is measured by the deformation of the measuring instrument (Continued)

Figure 1:
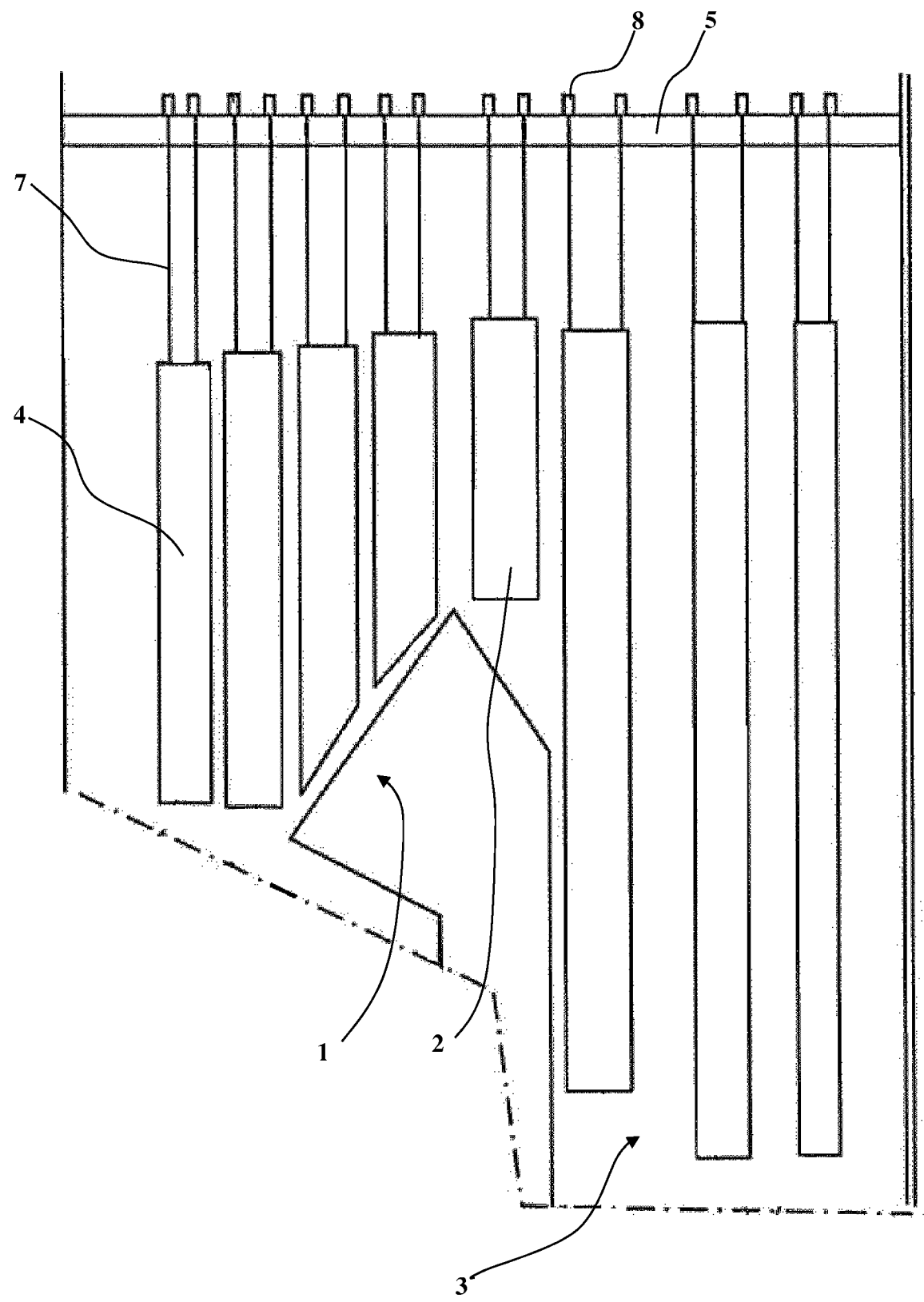

(15). A connecting member (11) parallel to the hanger rod (7) may be located between the measuring elements (9, 10), which connecting member (11) relays the change in the length to the measuring instrument (15). An elastic member (16) may be attached between the measuring element (9) and the upper measuring element (10).

15 Claims, 4 Drawing Sheets

(51) Int. Cl.
*F22B 37/48* (2006.01)
*F28F 19/00* (2006.01)
*F28G 15/00* (2006.01)
*G01G 19/18* (2006.01)
*G01L 1/10* (2006.01)
*G01L 1/22* (2006.01)

(52) U.S. Cl.
CPC ............... *G01G 19/18* (2013.01); *G01L 1/10* (2013.01); *G01L 1/22* (2013.01); *F22B 37/48* (2013.01); *F28F 2200/00* (2013.01); *G01L 1/106* (2013.01)

(58) Field of Classification Search
CPC ........... G01G 19/18; G01L 1/10; G01L 1/106; G01L 1/22
See application file for complete search history.

(56) References Cited

U.S. PATENT DOCUMENTS

| 10,132,495 | B2 | 11/2018 | Pollanen |
| 2006/0065291 | A1* | 3/2006 | Jones ................. F28G 1/166 |
| | | | 134/34 |
| 2008/0210178 | A1 | 9/2008 | Frach et al. |
| 2009/0090311 | A1 | 4/2009 | James et al. |

FOREIGN PATENT DOCUMENTS

| DE | 10 2005 035 556 | 2/2007 |
| FI | 20080395 | 12/2009 |
| FR | 2 555 740 | 5/1985 |
| WO | 2004/102104 | 11/2004 |
| WO | 2014/199016 | 12/2014 |

OTHER PUBLICATIONS

"Research and Application of Earth Stress Measurement Theory", Information Office of Institute of Crustal Dynamics in China, p. 106, Geology Press (Sep. 30, 1987)(with partial English Translation).
International Search Report for PCT/FI2020/050313, mailed Oct. 20, 2020, 4 pages.
Written Opinion of the ISA for PCT/FI2020/050313, mailed Oct. 20, 2020, 6 pages.
"Research and Application of Earth Stress Measurement Theory", The Information Office of the Institute of Crustal Dynamics in China, Geology Press, seven pages (Sep. 30, 1987)(with machine translation).

* cited by examiner

METHOD AND AN ARRANGEMENT FOR MEASURING MASS CHANGES OF HEAT EXCHANGERS OF A STEAM BOILER

This application is the U.S. national phase of International Application PCT/FI2020/050313, filed May 8, 2020, which designated the U.S. and claims priority to Finnish Patent Application 20195386, filed May 9, 2019, the entire contents of each of which are hereby incorporated by reference.

SCOPE OF THE INVENTION

The scope of the invention is a method and an arrangement for measuring mass changes of heat exchangers of a boiler.

BACKGROUND OF THE INVENTION

The upper part of a steam boiler is provided with a set of heat exchangers, in which the heat contained in flue gases is transferred to the water or water vapor flowing in a piping. A steam boiler can have e.g. eight heat exchanger banks connected in series, each of which can have e.g. 25 planar heat exchangers, between which the flue gas flows.

For allowing an obstacle-free thermal expansion, the heat exchangers are usually suspended by means of hanger rods from support beams and frame beams above the steam boiler. Each heat exchanger is usually supported by two hanger rods, each of which is connected to front and back ends of an individual heat exchanger. The structure which is zo based on hanger rods is used because sufficiently rigid support is difficult to arrange close to the heat exchangers.

Fouling of the heat transfer surfaces of a steam boiler hampers the heat transfer from flue gas into the medium circulating in a heat exchanger. Recovery boilers used for the combustion of black liquor are especially prone to the fouling of heat transfer surfaces, since remarkable amounts of flue ash exit the furnace of the recovery boiler entrained in the flue gas flow, which flue ash forms deposits onto the heat transfer surfaces.

Typically, impurities are removed from the heat transfer surfaces by a soot-blowing device, the operative steam for which is taken from the steam production of the boiler itself. The energy-content of the steam used for soot-blowing decreases the energy-content of the steam being transferred from the steam boiler into the turbine and other processes.

Determining the soot-blowing intervals is essential for optimizing the overall efficiency of the steam boiler. The soot-blowing devices are used based on an operation model drafted based on operational situations and experience. In the most important and most easily fouled areas, the soot-blowing devices are operated more frequently than elsewhere.

Soot-blowing maintains the efficiency and steam production capacity of the boiler by regularly removing deposited ash and slag from the heat surfaces of the boiler. Therefore, it is important to form by means of process measurements a view of the soot-blowing requirement of the boiler, so that soot-blowing can be effected in a proper part of the boiler at a proper time. By effecting the soot-blowing according to need, considerable amounts of steam can be saved and the efficiency obtained from the boiler is increased. Especially with the recovery boilers, excessive accumulation of deposits can lead to premature and thus expensive shutdown of the boiler.

Monitoring the mass changes of heat exchangers is known e.g. from publication U.S. Pat. No. 6,323,442, in which the mass of a heat exchanger bank is measured by means of strain gages attached to the hanger rods. The hanger rods support the collector pipes of the inlet and outlet flows of the heat exchanger bank, which pipes in turn support the individual heat exchangers. Additionally, the temperatures of the hanger rods have to be measured for accomplishing temperature compensation. In publication WO2004102104, the measurements are obtained from the hanger rods by load sensors, which are more precise than strain gage measurements.

SUMMARY OF THE INVENTION

Placing the load sensors into an existing steam boiler is in practice difficult. The required big load sensors are expensive and their retrofitting requires opening the fastening of the hanger rod and supporting the heat exchanger during installation.

Hanger rods are robust and are typically about 40 mm thick. The length of a strain gage is typically only a few centimeters at the most. The change of mass due to the fouling does not cause remarkable elongation of the hanger rods within such a short measuring distance. The problem for both load sensors and strain gages is that the mass of the foulings is minor compared to the mass of the clean structure. The total mass of a superheater can exceed 10 000 kg whereas the maximum amassed fouling can attain 5-10% of the total mass. In order to control and optimize the fouling, the resolution should be such that changes from to 10 kg to a few tens kilograms will be indicated. Hence the needed resolution is only a few per mill of the total mass of the furnace. The resolution of the previously mentioned methods isn't enough for accurate monitoring nor to controlling of the soot-blowing operations based on the measurement data. The elongation of the hanger rods due to mass changes is also so small, that the required precise dimension measuring instruments are expensive. As the number of heat exchangers is high also the number of measurement instruments needed to obtain comprehensive measurement results is high. The cost of the measurement instruments plays an important role since the number of instruments needed is counted, at least in tens, if not in hundreds. Therefore the cost of an accurate measurement system can easily exceed the benefits obtained through the measurement data.

The present invention aims to eliminate in particular the problems relating to the resolution and the installability. The method and the measurement arrangement according to the invention are defined in the independent claims.

In the method and the measurement arrangement according to the invention, an upper measurement element and a lower measurement element are connected to the heat exchanger hanger rod. The heat exchanger mass changes are measured by the changes in distance between the measurement elements. When the measurement elements are located at an adequate distance from each other, accumulation of fouling causes adequate elongation of the hanger rod, so that it is reliable measurable. The long distance amplifies the measurement results to distinctive. The arrangement thus acts as a mechanic amplifier.

An advantageous distance is between 200 mm-2000 mm, and a more advantageous distance is between 500 mm-1500 mm. The minimum distance mainly depends on the dimensions of the hanger rod and the used measurement method which have an impact on the resolution of the arrangement. The maximum distance depends on mountability of the arrangement and the space available.

A measurement instrument is advantageously connected by an analogical or a digital channel to a measuring system, a soot-blowing control or to a process controller of a plant. The upper and lower measurement elements as well as the structures of the measurement arrangement situated between them is not meant to carry suspension forces, but to relay the changes in the distance for the measuring instrument. The measuring instrument is advantageously a sensor attached between the measuring elements which measures the changes in the distance through deformation. The measured deformation is comparable to the mass changes of the heat exchanger. The measuring instrument doesn't have to endure heavy forces, but it's operating range can be optimized to fit to the representative mass changes. Advantageously a connecting member such as a rod, a tube, a cable or a metal wire parallel to the hanger rod is placed between the measuring elements for relaying the changes in distance to the measurement instrument. An elastic member, in which major deformation occurs as the distance between the measuring elements change, can be arranged between the measuring instrument and the measuring elements. By the elastic member, the measuring can for example be matched to an operating range of a highly sensitive and accurate load sensor for maximizing the resolution. The elastic member itself can also function as a measuring instrument. The elastic member can also prevent buckling of the connecting member during negative load. At least one intermediate support may be installed to dampen vibrations and prevent buckling. The intermediate support do not prevent any vertical movement of the connecting member nor cause any stress. Advantageously the measuring arrangements are engaged after accomplishing suspension of the heat exchangers.

Advantageously in particular the connecting member in parallel to the hanger rod and the elastic member have substantially the same coefficient of thermal expansion as the hanger rod. Then the solution can automatically compensate impacts of changes in temperature. Thus the structure filters out mechanically changes in temperature. If the area measured is thermally isolated, any temperature measurements for the compensation are unnecessary.

The connecting member can act both as an elastic member and a deformation measuring instrument. For example, the specific frequency of a metal wire suspended between the measuring elements changes according to the changes in the elongation of the hanger rods. The change of the specific frequency is calibrated to correspond to the heat exchanger mass changes.

Advantageously the upper measuring element is a support beam and the measurement means is attached thereto. By doing this the installation of a separate measuring element can be avoided, and a minimal need of space, most convenient mountability and maximal measurement length is attained.

In addition to the control of the soot-blowing the mass change can be used to determine the need for implementation of a temporary cooling cycle to remove deposited slag or the shut down of the steam boiler to clean the heat transfer surfaces. It may not be necessary to measure a hanger rod of each heat exchanger, but for example every second or every third, because the fouling is typically strongest in certain areas of a heat exchanger bank. Then the indication provided by the hanger rod of the adjacent heat exchanger can be used to assess the dirtiness of the heat exchanger between them, for example by using the average of the measurement results of the adjacent heat exchangers. The short-term scattering and variation of the measurements due to, among other things, the movements of the heat exchangers is preferably filtered by means of electronic or digital filtration.

LIST OF DRAWINGS

Figure 2:
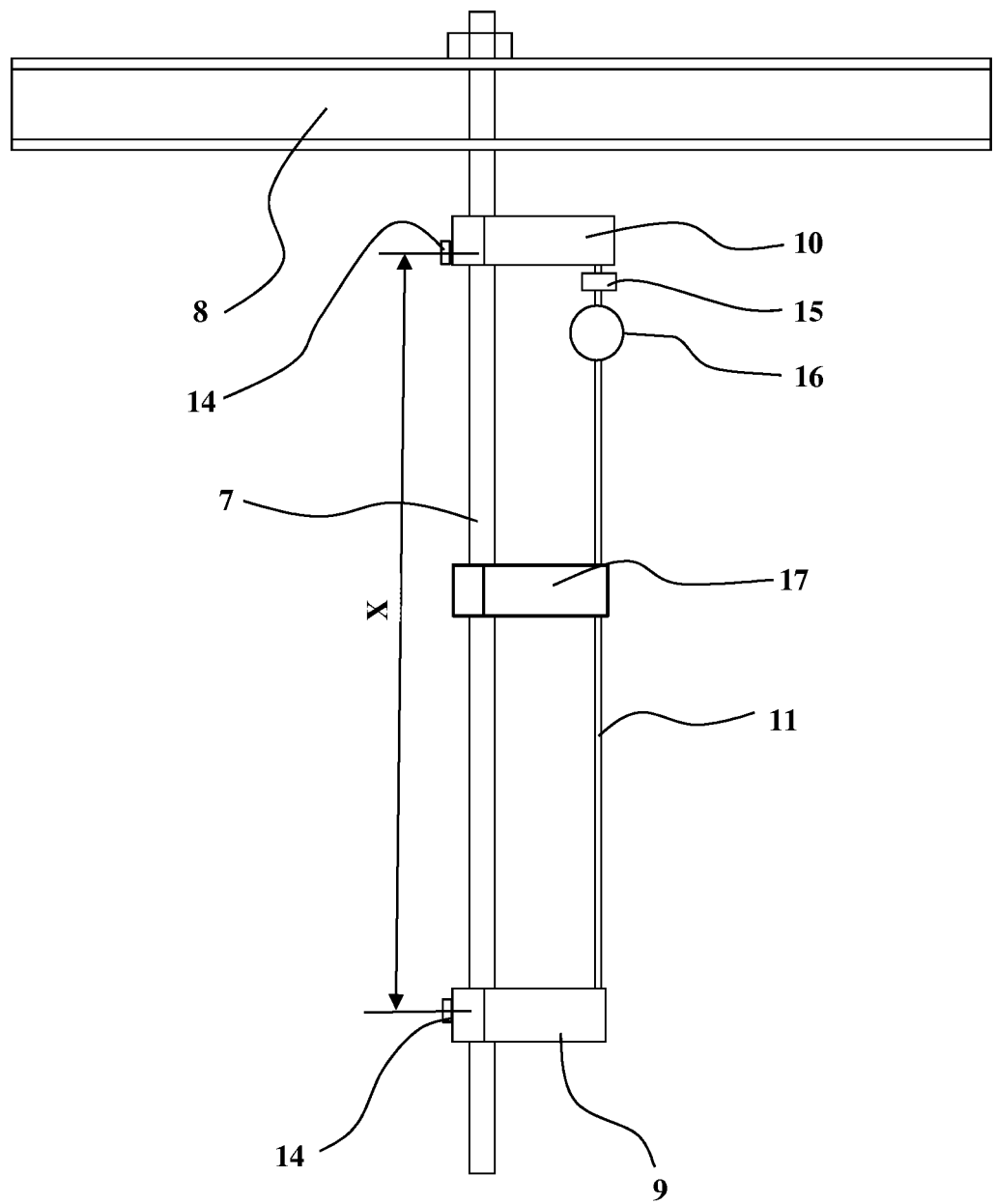
Figure 3:
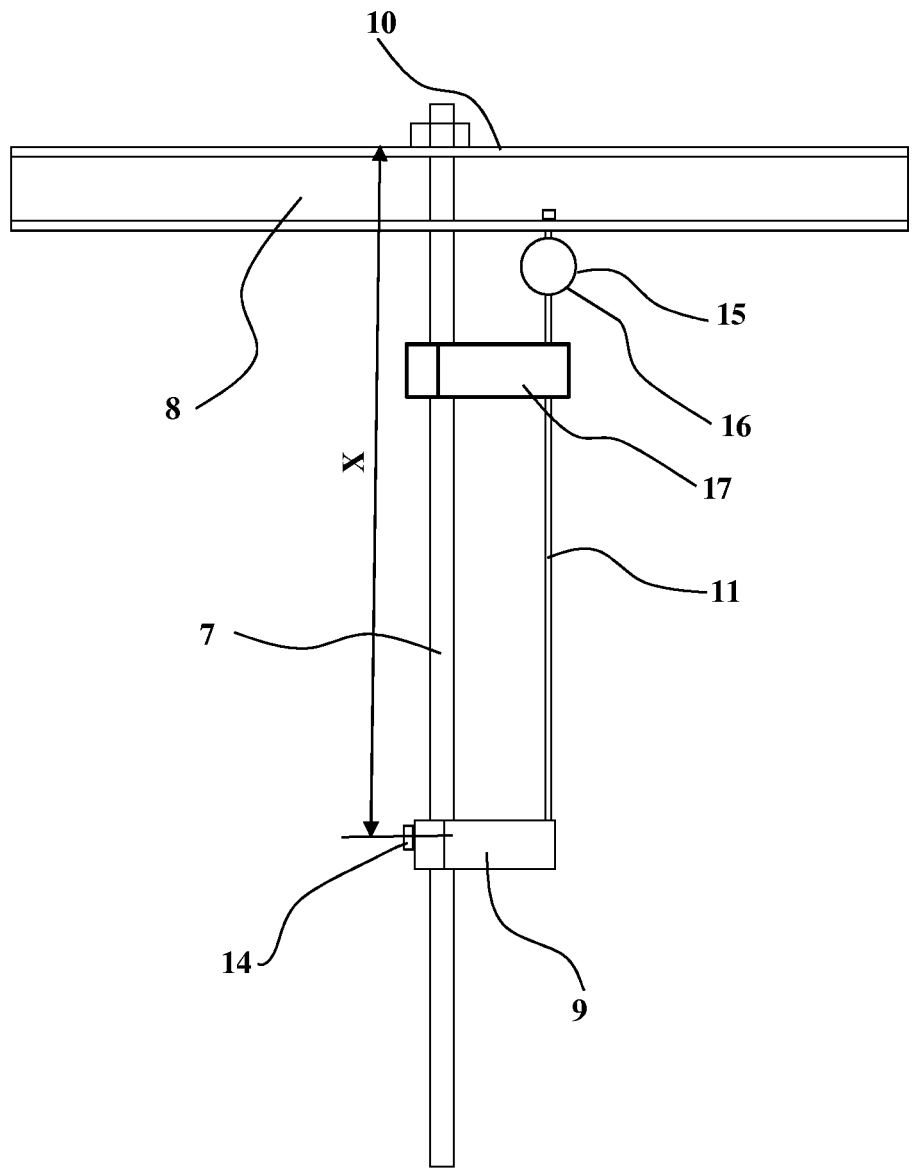
Figure 4:
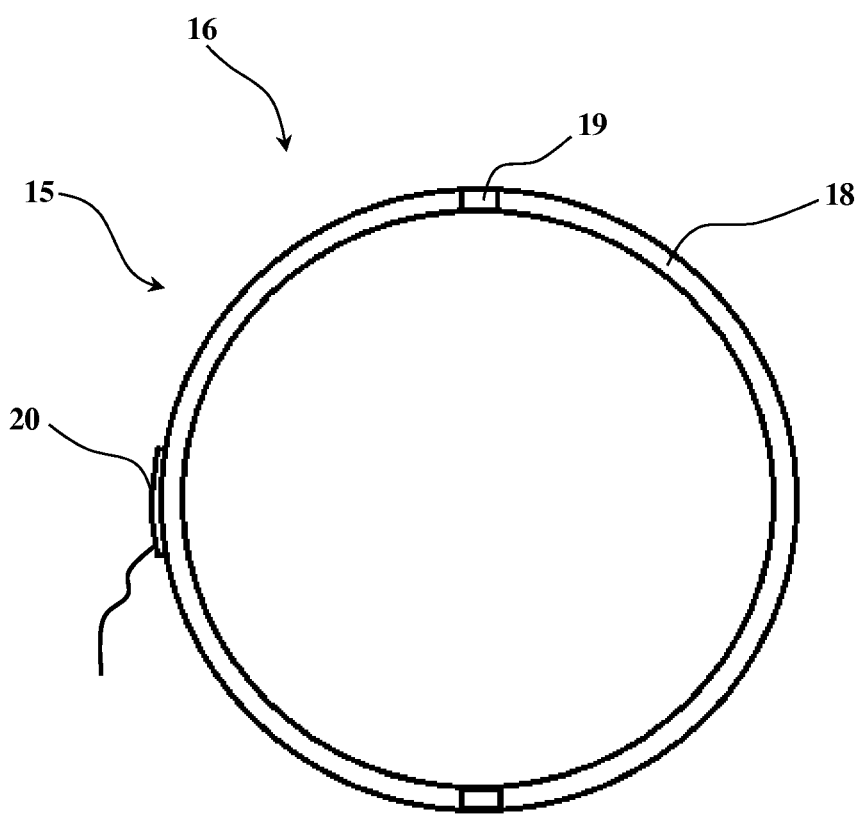

FIG. 1 illustrates as a side view the heat exchanger banks of a recovery boiler and their support on the frame beams of the boiler, FIG. 2 illustrates a measuring arrangement for measuring the change of a distance, FIG. 3 illustrates an advantageous measuring arrangement, in which the upper measuring element is the support beam and FIG. 4 illustrates an advantageous measuring instrument.

DETAILED DESCRIPTION OF THE INVENTION

FIG. 1 illustrates that suspending the heat exchanger banks 1, 2, 3 by the frame columns 6 and the frame beams 5 facilitates their unobstructed thermal expansion. The number of heat exchanger banks 1, 2, 3 varies depending on the boiler type. In this case the boiler comprises eight consecutive heat exchanger banks, out of which the first four in the flow direction of flue gas are steam superheaters 1, followed by boiler tubes 2 for evaporating water and the last two heat exchanger banks are water preheaters 3. Each heat exchanger bank 1, 2, 3 comprises a number of heat exchangers 4 in which water of steam flows. There is typically 20-30 heat exchangers 4 situated side by side in each exchanger bank 1, 2, 3. Heat releasing hot flue gas flows between the heat exchangers 4. Each heat exchanger is suspended by two hanger rods 7 from two support beams 8, which in turn are supported to the frame beams 5. If, for example, the structure has a spacer beam supported by the support beams 8 by means of hanger rods 7, which supports the heat exchangers with the lower hanger rods 7, more accurate results are obtained from the lower hanger rods 7.

If there are spacer beams or collector pipes of inlet and outlet flows of a heat exchanger bank below hanger rods 7 supported from the support beam 8 spreading forces horizontally, measurement of the mass changes cannot directly be addresses to an individual heat exchanger 4. Still, by measuring from the hanger rods 7, it can be indicated in which section of the heat exchanger bank fouling has accumulated and soot-blowing can be targeted according to the indication. In that case a good resolution of measurement is especially important because the intermediate structures will dampen measurements of changes related to individual heat exchangers.

The change in mass of the heat exchangers 4 can be most accurately measured by combining the measurements of the hanger rods 7 of the leading edge and the trailing edge. Sufficient accuracy is already achieved with measurements of the leading edge hanger rods 7. The leading edge fouls faster than the trailing edge. Contamination also reveals itself as an increasing resistance of flow of flue gas, whereby the front edge hanger rods 7 are subjected to an additional load caused by the increasing flow resistance. Thus, in the front edge hanger rods 7, an amplification of the fouling indication always happens. In the case of the trailing edge hanger rods, the situation is the opposite.

FIG. 2 illustrates an arrangement, where the change in distance of measuring elements 9, 10 is measured indirectly with a load sensor 15. The load sensor 15 can be an arrangement based on one or plurality of strain gages connected to an item owing an applicable stiffness. Load sensors 15 are also widely available commercially. An elastic member 16 is fastened between the measuring element 9, 10 and the load sensor 15. The elastic member 16 may be, for example, an open, thin and short profile tube. If the elastic member 16 is not used, then the thickness of the rod acting as a connecting member 11 and the elasticity of the load sensor 15 as a measuring instrument must be carefully selected, because remarkable forces within the elasticities in the connecting member 11, the load sensor 15 and the fixtures of the measuring elements 9, 10 affect to the accuracy of the method and to the magnitude of the active forces.

The ratio of the data obtained from measurement means 15 and the mass changes of the hanger rod 7 must usually be calibrated during installation. The calibration can be performed for example by a known mass effecting loading of a hanger rod 7. The measuring arrangement can also be preloaded. Preferably an intermediate support 17 supports the thin and long connecting member 11 relaying the change of the distance. Especially when the measuring instrument extends from the lower measuring element to the upper measuring element, the connecting member 11 is not required.

Minimal movement and displacement of the measuring element 9, 10 on the surface of the hanger rod 7 may occur during the use of the boiler. Preferably, the bodies of the measuring elements 9, 10 are tightened around the suspension rods 7 asymmetrically in the vertical direction, e.g. with screws 14, preferably on the side closer to the second measuring element 9, 10. The tightest tightening point can further be designed to locate on the surface closest to the second measuring element. Due to the arrangement, elongation changes do not result in the movement of the measuring element 9, 10 on the surface of the suspension rods 7 and the distance between the fixing points of the measuring elements 9, 10 i.e. measuring length X remains unchanged.

FIG. 3 illustrates a very advantageous arrangement where the upper measuring element 10 is a support beam 8. The measuring length X extends to the upper surface of the support beam 8, on top of which the fastening element of the hanger rod 7 is located. In this solution, the elastic member 16 and the measuring instrument 15 are combined to the same component. The measuring instrument 15 is preferably attached to the lower flange plate of the support beam 8 and does not affect the measuring length X, because the support beam 8 does not substantially flex vertically due to mass changes or measuring forces and it has normally substantially the same thermal expansion coefficient as the hanger rod 7. The measuring instrument 15, the elastic member 16 or the connecting member 11 may also be attached to the upper flange plate or to the web either aside or through the lower flange plate, whereby the lower flange plate can act as an intermediate support for the connection member 11.

As illustrated in the embodiments of FIG. 2 or 3 the rod functioning as connecting member 11, an elastic member 16 and/or measuring instrument 15 can be replaced by a thin pre-stressed metal wire, and changes of the measuring length X can be measured by an instrument measuring the changes of the specific frequency of it. In this embodiment an intermediate support 17 is not necessary unless it is necessary to adjust the specific frequency to a certain frequency range. A measuring solution using the same principle is disclosed in publication FI20080395, where change of the specific frequency of hanger rods is directly measured. However, the solution according to the publication has the same problem linked to the resolution as exists with other measurement solutions where tension of a hanger rod 7 is measured directly.

FIG. 4 shows an example of the measuring instrument 15, which also functions as an elastic member 16. The frame 18 of it is a sleeve-like piece provided with fixing holes 19 in order to attach it to the connecting member, to the measuring element 9, 10 or to the support beam 8. Fastening the sleeve to the measuring arrangement may be accomplished with any other robust fasteners or joining means. At least one strain gage 20 is attached to the frame 18 for measuring deformations of it. The strain gage 20 is connected to a measuring device (not represented) which transforms changes of it's electric properties into measurement results. The obtained results can be calibrated to be proportionate to changes in X, whereby heat-exchangers' mass changes can be calculated using the coefficient of elasticity and the cross-sectional area of the hanger rods.

Advantageously the measuring arrangement is pre-stressed so that the frame 18 is under a tensile force in all circumstances and it will not be subjected to compressing forces. Thereby any possible non-linearity in the measurement results caused by clearances of the structure are avoided. The frame 18 can also be a piece of profile of some other closed or open shape than a circular sleeve, or it can be a straight metal sheet thinned at the location of the strain gage. In connection with a straight metal sheet, it may be necessary to use a separate elastic member 16. Because the changes in the stretching of the hanger rods 7 are very small, the structure of the measuring instrument 15 can be very slim. Thereby even the smallest changes in the measurement length X can be indicated with high resolution by the strain gage measurements and the structure of the arrangement is not subjected to significant forces.

A solution according to the invention could also be realized so that very long, strain gages 20 reaching the mentioned advantageous lengths or subsequent combinations of them thereof are fixed directly onto the surfaces of the hanger rods 7. Thereby the highest and lowest fixing points of the strain gages would function as the measuring elements 9, 10, from which the changes of the measuring length X is measured. Long strain gages normally would require thermal sensors aside them for accomplishing thermal compensation.

The invention claimed is:

1. A measuring arrangement for measuring mass changes of heat exchangers of a steam boiler, wherein the heat exchangers are in a heat exchanger bank and are supported by hanger rods attached to frame beams above the steam boiler, the measuring arrangement comprising:
   a lower measuring element connected to a first hanger rod of the hanger rods supported by the frame beams, wherein the hanger rods are attached to and support the heat exchangers in the heat exchanger bank;
   an upper measuring element connected to the first hanger rod, wherein a measuring length is a vertical distance between the upper and lower measuring elements;
   a measuring instrument connected to the upper and lower measuring elements, wherein the measuring instrument is configured to measure a change in the measuring length between the lower measuring element and the upper measuring element, and
   wherein the change in the measuring length is indicative of a change in a mass of at least one of the heat exchangers.

2. The measuring arrangement of claim 1, wherein the measuring instrument is between the upper and lower measuring elements.

3. The measuring arrangement of claim 1, further comprising:
a connecting member offset from and parallel to the hanger rod and between the upper and lower measuring elements, wherein the measuring instrument is attached to the connecting member.

4. The measuring arrangement of claim 3, further comprising an elastic member attached to the connecting member between one of the upper and lower measuring elements and the measuring instrument.

5. The measuring arrangement of claim 4, wherein a coefficient of thermal expansion of the elastic member is substantially equal to a coefficient of thermal expansion of the first hanger rod.

6. The measuring arrangement of claim 4, wherein the elastic member includes a frame to which is attached the measuring instrument, and the measuring instrument includes a strain gage configured to measure a deformation of the frame, wherein the measurement of the deformation is indicative of the change in the measuring length.

7. The measuring arrangement of claim 3, wherein the measuring length is in a range of 200 mm to 2000 mm.

8. The measuring arrangement of claim 1, wherein the measuring instrument includes a metal wire and a device measuring a specific frequency of the metal wire.

9. The measuring arrangement of claim 1, wherein the upper measuring element is a support beam connected to the first hanger rod.

10. An assembly comprising:
frame beams above a steam boiler;
support beams supported by the frame beams and extending transverse to the frame beams;
hangers each having an upper end portion attached to one of the support beams and a lower end region attached to and supporting a respective one of a plurality of heat exchangers;
an upper measuring element extending around and fixed to an upper portion of a first hanger rod of the hangers,
a lower measuring element extending around and fixed to the first hanger rod at a position below the upper measuring element;
a suspension rod having an upper rod segment fixed to the upper measuring element and a lower rod segment fixed to the lower measuring element;
an elastic member aligned with the suspension rod, wherein a lower end region of the upper rod segment is fixed to an upper portion of the elastic member and an upper end region of the lower rod segment is fixed to a lower portion of the elastic member; and
a load sensor connected to the suspension rod or elastic member, wherein the load sensor is configured to detect a change in distance between the upper measuring element and the lower measuring element,
wherein the change in the distance is indicative of a change in a mass of the heat exchanger attached to the first hanger rod.

11. The assembly of claim 10, wherein a coefficient of thermal expansion of the elastic member is substantially equal to a coefficient of thermal expansion of the first hanger rod.

12. The assembly of claim 10, wherein the elastic member includes a frame to which is attached the load sensor.

13. The assembly of claim 10, wherein the elastic member is a frame with a circular shape.

14. The assembly of claim 10, wherein the load sensor includes a metal wire and the load sensor detects a specific frequency of the metal wire.

15. The assembly of claim 10, wherein a distance between the upper measuring element and the lower measuring element is in a range of 200 mm to 2000 mm.

\* \* \* \* \*